June 17, 1947.   W. H. TROEMEL   2,422,320
PRE-SET CONTROL
Filed April 1, 1944   5 Sheets-Sheet 2

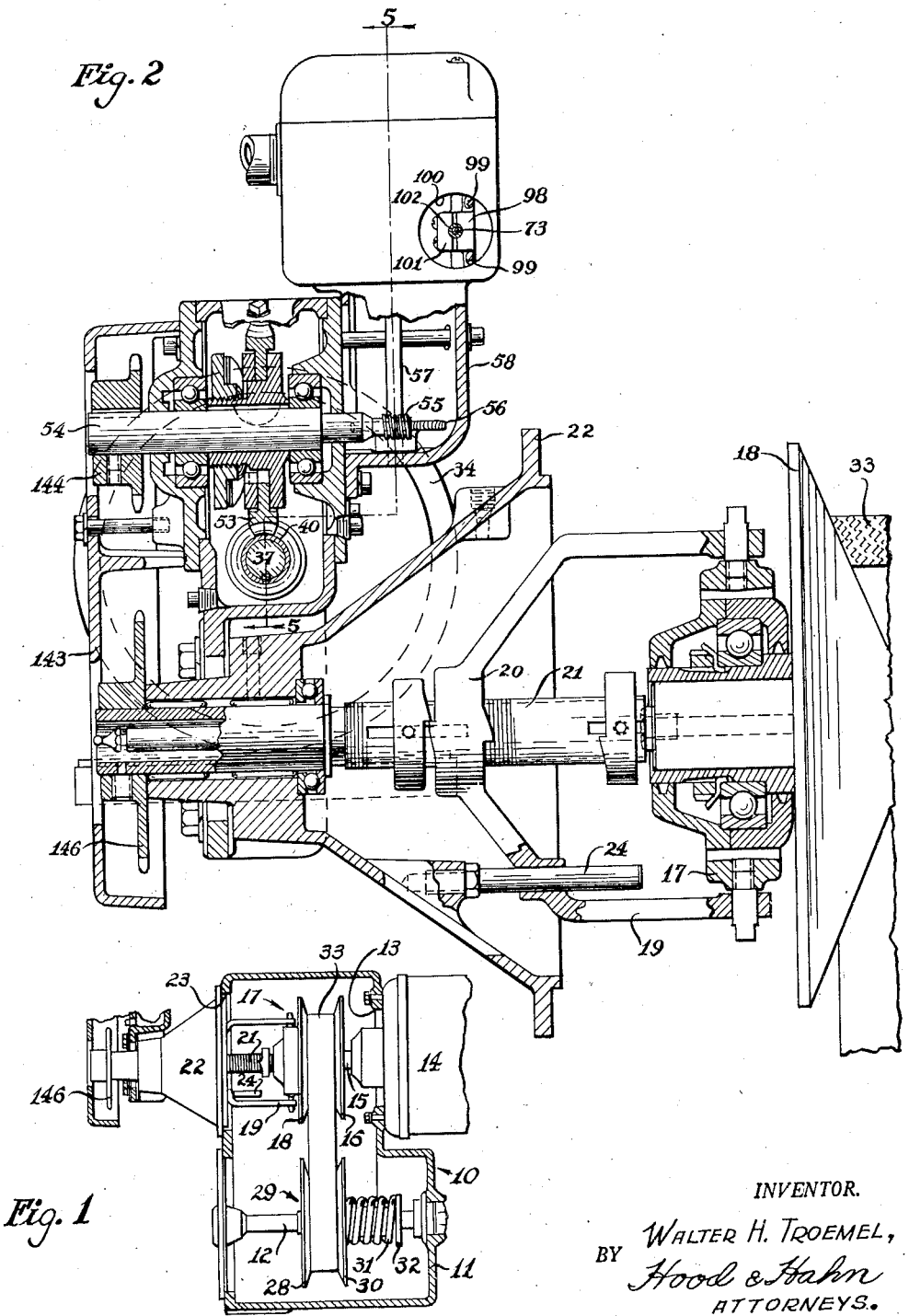

INVENTOR.
WALTER H. TROEMEL,
BY  Hood & Hahn
ATTORNEYS.

June 17, 1947.  W. H. TROEMEL  2,422,320
PRE-SET CONTROL
Filed April 1, 1944  5 Sheets-Sheet 3

INVENTOR.
WALTER H. TROEMEL,
BY Hood & Hahn
ATTORNEYS.

June 17, 1947.  W. H. TROEMEL  2,422,320
PRE-SET CONTROL
Filed April 1, 1944  5 Sheets-Sheet 4
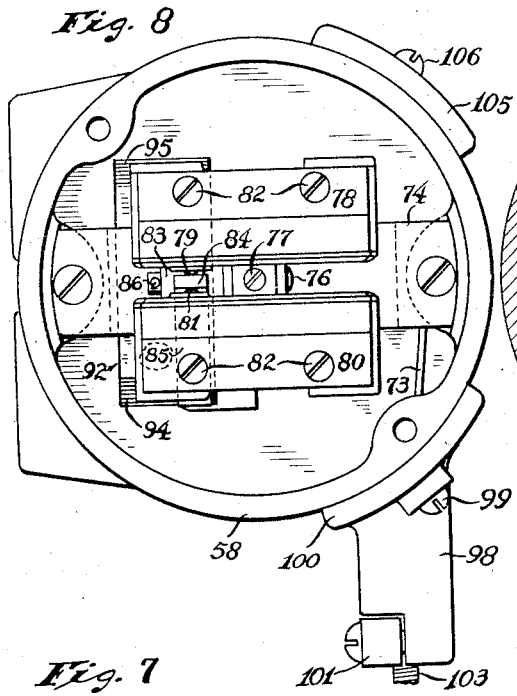
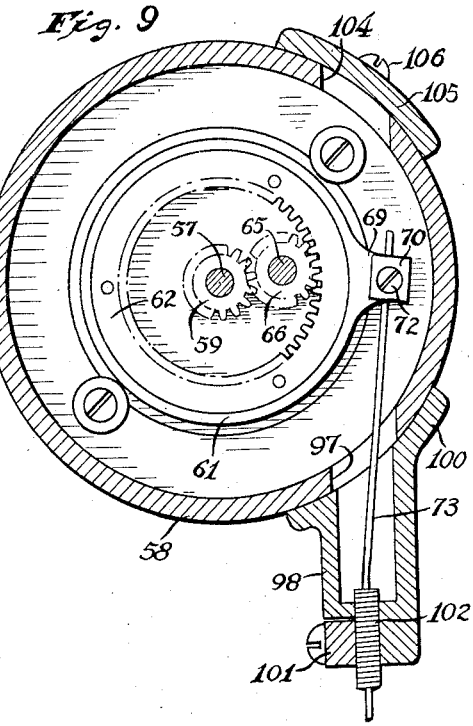
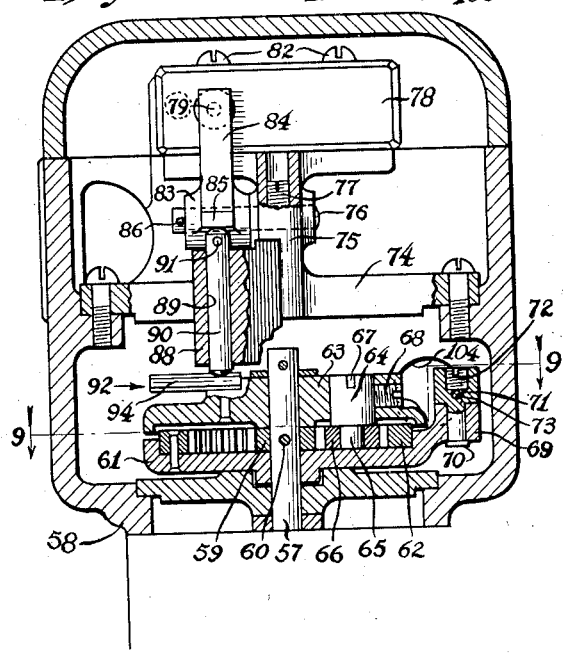
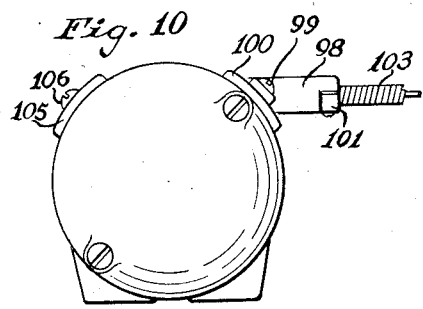
INVENTOR.
WALTER H. TROEMEL,
BY Hood & Hahn
ATTORNEYS June 17, 1947. W. H. TROEMEL 2,422,320
PRE-SET CONTROL
Filed April 1, 1944 5 Sheets-Sheet 5
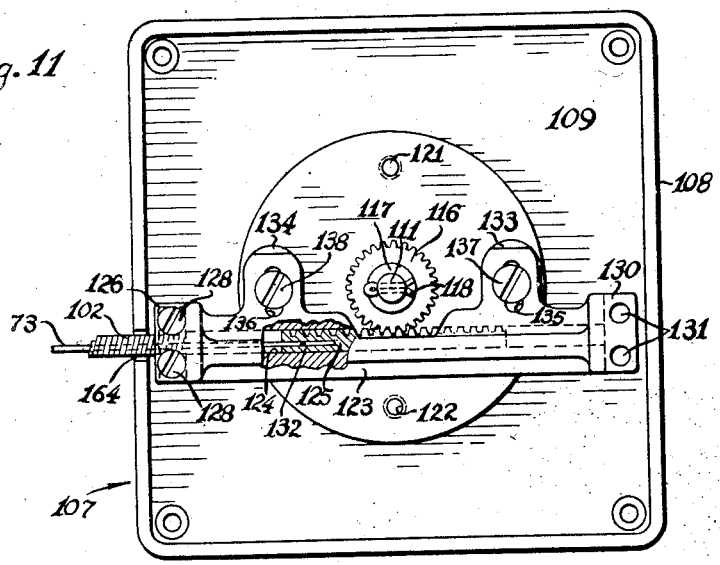
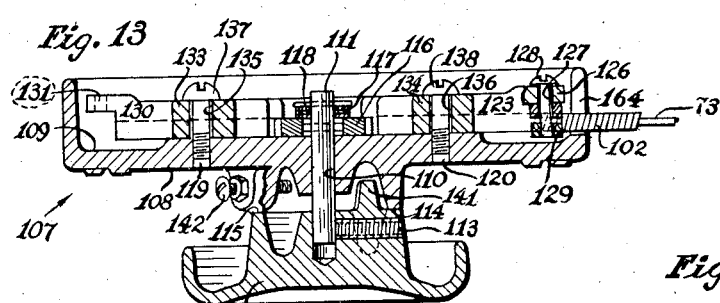
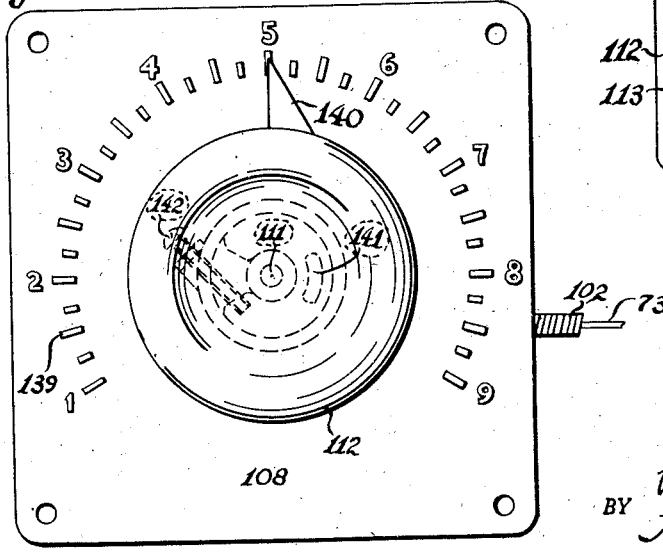
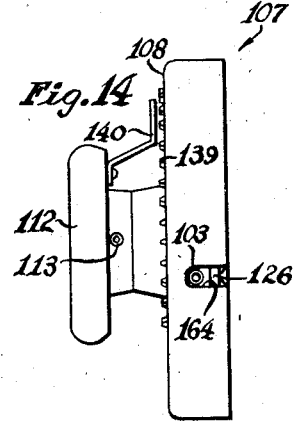
INVENTOR.
WALTER H. TROEMEL,
BY Hood & Hahn
ATTORNEYS.

Patented June 17, 1947

2,422,320

UNITED STATES PATENT OFFICE 2,422,320

PRESET CONTROL

Walter H. Troemel, Columbus, Ind., assignor to Reeves Pulley Company, Columbus, Ind., a corporation of Indiana Application April 1, 1944, Serial No. 529,199

12 Claims. (Cl. 192—2)

The present invention relates primarily to a pre-set control for a device of the general character of a "Reeves" speed varying transmission. The primary object of the invention is to provide mechanism including a manually adjustable element, adapted to be mounted at a point remote from the transmission to be controlled, said element being capable of being moved instantaneously to a desired position, and the mechanism being such that, when said element is so moved and then abandoned, the mechanism will, without further attention, bring the output speed of the transmission to a value corresponding to the setting of such element, and maintain that value until such time as the manually manipulable element is again shifted. I do not claim to be the first to have provided such means, broadly; but I have provided a novel form of mechanism for accomplishing the above function, my mechanism being simpler, less expensive, and less likely to get out of order than previous devices of the same general character which are known to me. A further object of the invention is to provide a device of the character above-described and having special characteristics which render the device unusually flexible for installation with its parts in various relationships to each other. A further object of the invention is to provide means for overcoming the inherent tendency of a device of the character here under consideration to "hunt" for the output speed value corresponding to the setting of the manually manipulable element. A further object of the invention is to provide a remote control mechanism for a reversible electric motor, wherever such a motor is used. A further object of the invention is to provide differential compensating mechanism for controlling the positions of any pair of facing shiftable elements. Still further objects of the invention will appear as the description proceeds.

To the accomplishment of the above and related objects, my invention may be embodied in the forms illustrated in the accompanying drawings, attention being called to the fact, however, that the drawings are illustrative only, and that change may be made in the specific constructions illustrated and described, so long as the scope of the appended claims is not violated.

Fig. 1 is a more or less diagrammatic view of a speed varying mechanism generally of the "Reeves" type, of the character to be controlled by an embodiment of the present invention;

Fig. 2 is an enlarged section through the control shaft of the transmission of Fig. 1, with my control mechanism shown in operative relation thereto, parts being shown in elevation;

Fig. 7 is a section through a portion of my control mechanism, and taken on a plane substantially perpendicular to the plane of Fig. 5;

Fig. 8 is a horizontal plan view of my control mechanism, the housing cover having been removed;

Fig. 9 is a horizontal section taken substantially on the line 9—9 of Fig. 7 and looking in the direction of the arrows;

Fig. 10 is a reduced vertical plan view of the control, with the housing cover in place;

Fig. 11 is a rear elevation of the remote control station unit forming a part of my invention, parts being broken away for clarity of illustration;

Fig. 12 is a front elevation thereof;

Fig. 13 is a horizontal section through said unit; and

Fig. 14 is a reduced side elevation, taken from the right of Fig. 12.

Figure 3:
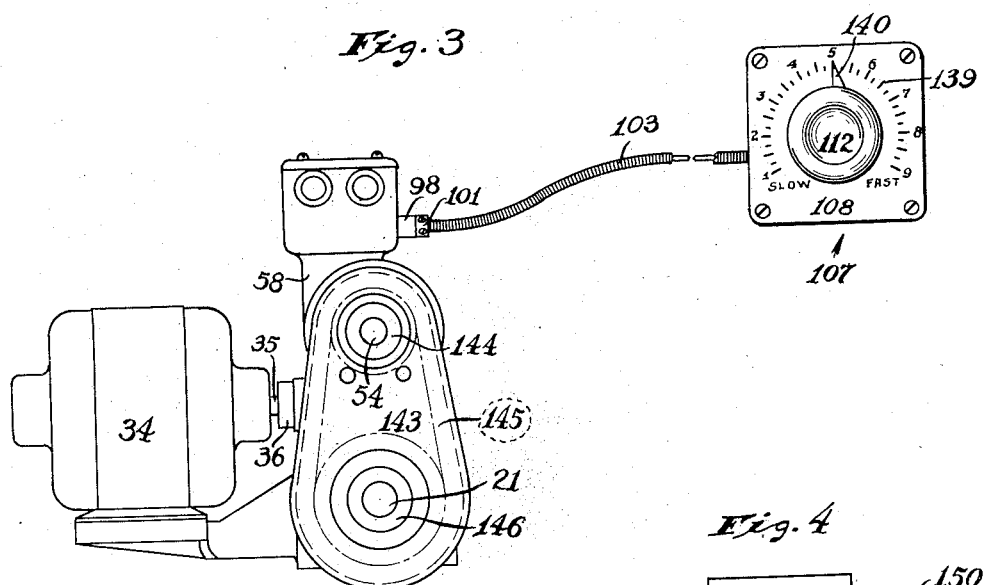
Fig. 3 is a more or less diagrammatic side elevation of my control mechanism.

Referring more particularly to the drawings, it will be seen that, in Fig. 1, I have illustrated a speed varying transmission unit, indicated generally by the reference numeral 10, and comprising a casing 11 in which is suitably journalled an output shaft 12. The casing is formed with a port 13 through which projects a portion of the frame of a main driving motor 14, said motor being suitably supported upon said casing. The spindle 15 of said motor carries a fixed coned disc 16 with which cooperates a mating coned disc 18 adapted to be shifted axially toward and from the disc 16 through the medium of a thrust bearing indicated generally by the reference numeral 17. A yoke 19 provides an operative connection between said thrust bearing and a nut 20 threadedly mounted upon a threaded adjusting shaft 21, said shaft being journalled in and supported by an adapter 22, suitably secured to the casing 11 in such a position as to close a casing port 23 through which said shaft 21 projects. The yoke is formed for cooperation with a rod 24, carried by the adapter 22, whereby said yoke and the nut 20 are held against rotation. Fixed to the shaft 12 is a coned disc 28 with which cooperates a mating coned disc 30 axially slidably mounted upon the shaft 12 and constantly resiliently urged toward the disc 28 by a coiled spring 31 sleeved upon the shaft 12, and compressed between the disc 30 and suitable abutment means 32.

An edge-active belt 33 provides a driving connection between the pulley made up of the discs 16 and 18, and the output pulley 29 made up of the discs 28 and 30. It will be obvious that, as the disc 18 is adjusted toward the disc 16, the belt 33 will be squeezed outwardly between said discs, whereby the effective pitch diameter of the driving pulley will be increased; and said belt will be correspondingly drawn inwardly between the discs 28 and 30, to shift said disc 30 toward the right against the tendency of the spring 31, to reduce the effective pitch diameter of the output pulley 29, whereby the angular velocity of the shaft 12 will be increased. Correspondingly, if the disc 18 is moved away from the disc 16, the belt 33 will be sufficiently relaxed to permit the spring 31 to shift the disc 30 toward the disc 28, thereby moving the belt outwardly over the faces of the discs 28 and 30 and pulling the belt inwardly between the discs 16 and 18, to reduce the effective pitch diameter of the driving pulley, increase the effective pitch diameter of the driven pulley, and reduce the output speed of the transmission.

The device, as thus far described, is so well known as to require no further discussion.

According to standard practice, the screw shaft 21 is customarily manually manipulated. Obviously, the transmission parts must be shifted relatively slowly, in order that the belt and the spring may be given a reasonable length of time in which to respond to movements of the disc 18. Alternatively, where the shaft 21 is driven by a reversible motor of any kind, the operator must customarily depress one button or another to cause energization of the motor in one direction or the other, and must stand and hold that button depressed until the shift has been completed.

The primary object of the present invention is to provide means which may be instantaneously shifted by the operator, together with mechanism which will, upon such shifting, respond automatically to bring the transmission parts to a position corresponding to the new position of the shiftable means, so that the attention of the operator need not be diverted from his work throughout the period of adjustment, but may be so diverted only long enough to adjust the manually manipulable element.

A reversible electric motor 34 has its spindle 35 (see Fig. 5) operatively connected, through a suitable coupling 36, to a shaft 37 journalled in ball bearings 38 and 39, said shaft 37 carrying a worm 40.

A frame 41 is suitably mounted adjacent the outboard end of the shaft 37, and houses a solenoid coil 42 together with its core 43.

Said outboard end of the shaft 37 is formed with a spline 44 with which cooperate a plurality of friction discs 45, said discs being, as is clearly shown, axially shiftable with respect to, but rotatable with, the shaft 37.

The frame 41 is formed with one or more slots 46 extending parallel with the axis of the shaft 37. So associated with said slots 46 as to be held against rotation is a friction disc 47 which is likewise held against axial movement; and a further series of friction discs 48, equal in number to the discs 45, is similarly associated with the slot or slots 46 to be held against rotation, said discs 48, however, being axially movable. The disc 47 forms a backing piece for the inboard one of the discs 45, while the discs 48 are sandwiched between, or interdigitated with, the discs 45. Associated with the outboard one of the discs 48 is a follower 49, normally pressed against the adjacent disc 48 by spring means 50 with sufficient force to bring all of said discs 47 and 48 into frictional engagement with the discs 45, thereby to hold the shaft 37 frictionally against rotation. The spring 50 is engaged between the follower 49 and a suitable stationary backing element 51.

The solenoid core 43 is formed with a reduced threaded extension 52 threadedly engaged with the follower 49; and said follower 49 is axially shiftable within the frame 41. It will be clear from an inspection of Fig. 5 that, when the solenoid 42 is energized, its core 43 will be moved toward the left against the tendency of the spring 50 to relieve the pressure upon the discs 45, 47 and 48, thus releasing the shaft 37 for rotation.

A worm wheel 53, meshing with the worm 40, is carried upon a shaft 54, suitably journalled in the fashion, for instance, illustrated in Fig. 2; and said shaft 54 likewise carries a worm 55 meshing with a worm wheel 56 carried upon a shaft 57 suitably journalled in a housing 58. It will thus be seen that the shaft 37 is connected to drive the shaft 54 at a reduced speed, and that the shaft 54, in turn, is connected to drive the shaft 57 at a still further reduced speed. As will be seen hereinafter, the shaft 54 is further connected to drive the screw control shaft 21.

Referring, now, to Fig. 7, it will be seen that a sun gear 59 is secured to the shaft 57, adjacent the upper end thereof, by a pin 60, or the like. Suitably mounted within the housing 58 for independent rotation about the axis of the shaft 57 is a carriage 61 removably supporting a ring gear 62 in the plane of said sun gear 59. Likewise mounted in the housing for independent rotation about the axis of the shaft 57, and above the gear 59, is a carrier 63. A cylindrical pin 64, having an eccentric downwardly projecting finger 65, is mounted in said carrier for oscillation upon an axis parallel with the axis of the shaft 57; and said finger 65 constitutes a journal mounting for a planet gear 66 meshing with said sun gear 59 and with said ring gear 62. The pin 64 is formed with a kerf 67 in its upper end for facilitating rotational adjustment thereof; and a set screw 68 is provided for holding said pin 64 in adjusted position.

It will be obvious that the function of the eccentric mounting of the journal finger 65 is to permit adjustment of the journal axis of the planet gear 66 to compensate for the selective use of sun gears and ring gears of varying pitch diameters. A somewhat clearer perception of the manner in which the journal axis for the planet gear may be adjusted is perhaps obtainable from an examination of Fig. 6.

An ear 69 projects radially from a point on the periphery of the carriage 61 and provides a journal mounting for a post 70 oscillable about an axis parallel with the axis of the shaft 57. The upper portion of said post 70 is provided with a suitable opening 71 therethrough, and a set screw 72 is projectible vertically into said opening to clamp in place an end of a wire or cable 73, in the manner clearly illustrated in Figs. 5, 7 and 9.

Preferably, the wire 73 will be the wire of a Bowden wire assembly.

Suitably mounted within the housing 58 is a bracket 74 having a post portion 75 formed to support a trunnion pin 76, and a set screw 77 may be provided for securing the pin 76 in place. The bracket further provides a pair of tables upon one of which is mounted an electrical switch unit 78 of the normally open-circuit type, provided with an actuator button 79. The construction of the switch unit is such that, when the button 79 is shifted inwardly, the circuit controlled by the switch is closed. A similar, but allochirally arranged, switch unit 80 is mounted upon the other of said tables, said unit 80 having a button 81 similar to the button 79, and the two switch units being so arranged that the buttons 79 and 81 are in facing alignment. Machine screws 82, or other equivalent fastening means, secure the switch units 78 and 80 to their respective bracket tables.

A bell crank lever 83 is rockably mounted upon the trunnion 76, one arm 84 of said lever being positioned between, and in contact with, the two buttons 79 and 81. The other arm 85 of said lever projects substantially horizontally (see Fig. 5) and is loaded, by a spring 87 or the like, which urges said lever in a direction to shift the button 81 toward switch-closing position.

A vertical portion 88 of the bracket 74 is formed to provide a tubular bearing 89 in which is reciprocably mounted an actuator pin 90 so positioned as to support the arm 85 of the lever 83 against movement in response to the bias of the spring 87. A stop pin 91 traverses said pin 90 adjacent its upper end, and cooperates with the upper end of the bracket portion 88 to limit downward movement of the pin 90.

A cam, indicated generally by the reference numeral 92, is suitably supported upon the carrier 63. Said cam comprises a strip of resilient material formed to provide a substantially horizontal table portion terminating at its opposite ends in allochiral downwardly inclined portions 94 and 95. The parts are so proportioned and related that, when the lower end of the pin 90 rests upon a portion of either incline 94 or 95 intermediate the ends thereof, the lever 83 will occupy a median position in which both switches 78 and 80 are in circuit-open condition. If the cam is moved to cause the pin 90 to ride up onto the table portion 93 thereof, from either inclined portion 94 or 95, the lever will be shifted to press the button 79 of the switch 78 to close the circuit dominated by said switch; while, if the cam is moved to permit the pin 90 to drop off the end of either inclined portion 94 or 95, the spring 87 will swing the lever 83 to press the button 81 to close the circuit dominated by the switch 80.

Figures 5, 6:
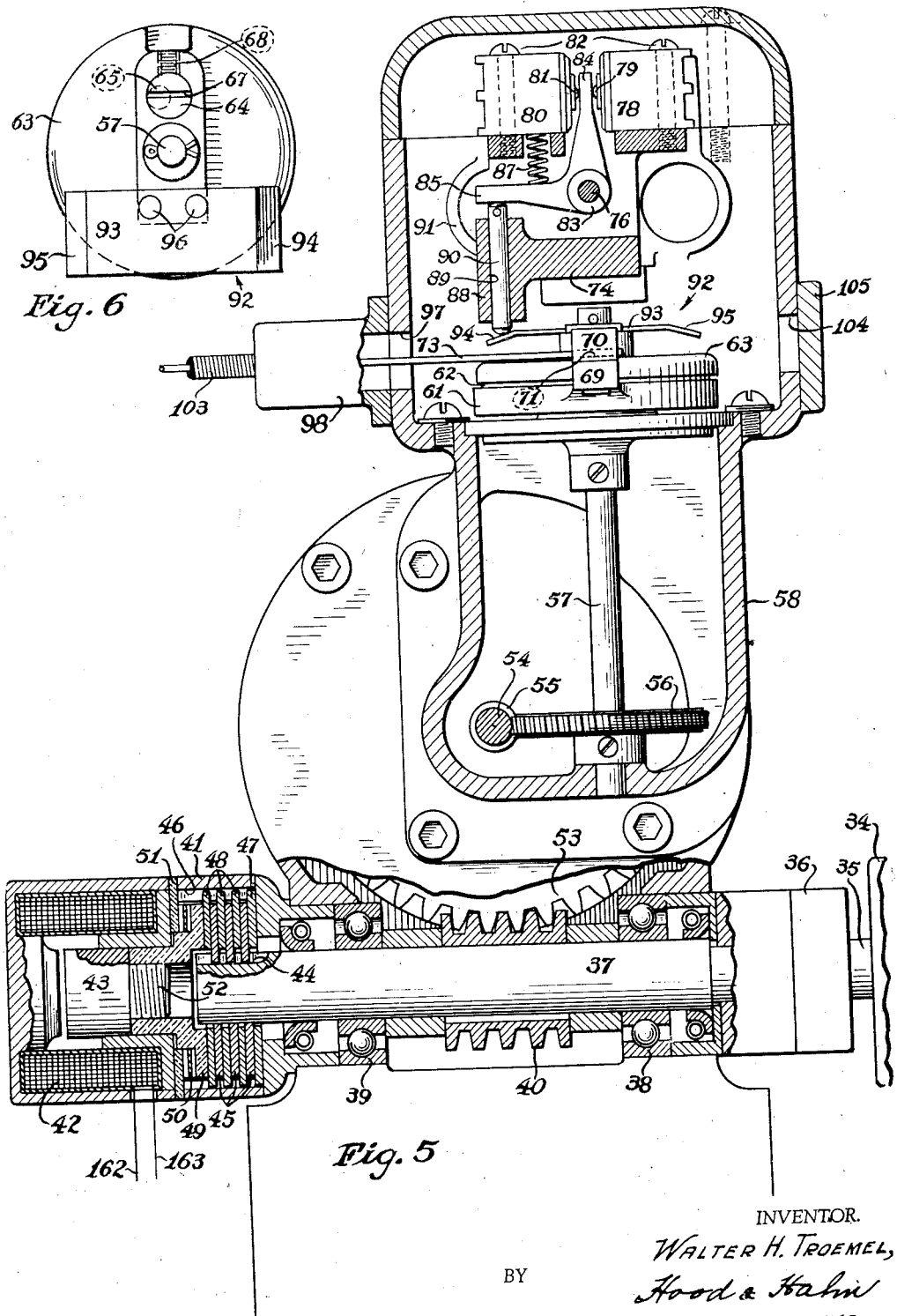
Fig. 5 is an enlarged vertical section through my control mechanism, taken substantially on the line 5—5 of Fig. 2 and looking in the direction of the arrows.
Fig. 6 is a top plan view of the cam carrier forming a part of my invention.

The cam may preferably be secured to the carrier 63 by means of rivets 96, in the manner clearly shown in Figs. 6 and 7.

The housing 58 is formed with a port 97 adapted to be closed by an adapter 98 which may be secured to the housing 58 in registry with said port 97 by means of screws 99 penetrating a flange 100 shaped to fit the contour of the housing 58, or by other equivalent fastening means. The adapter 98 is provided with clamping means 101 adapted to grip one end of the sheath 102 of a Bowden wire 103.

The housing 58 is formed with a second port 104, the ports 97 and 104 being located on opposite sides of a radius of the carriage 61 drawn through the post 70. The adapter 98 may be associated, if desired, with the port 104, instead of with the port 97. Preferably a closure plate 105 is provided, said plate being adapted to be secured to the casing 58 by screws 106 or the like to close that one of the ports 97 and 104 not currently in use to pass the wire 73.

In Figs. 11 to 14, I have shown the mechanism provided at a remote control station of the device of the present invention. That mechanism is indicated generally by the reference numeral 107, and comprises a member 108 formed to provide a cup 109. A substantially central bearing 110 formed in said member 108 provides a journal mounting for a shaft 111, to the outer end of which is secured a hand wheel 112, by means of a set screw 113, or the like. Preferably, the member 108 will be formed with a friction surface 114 for cooperation with a friction surface 115 provided on the hand wheel 112, and spring means, later to be described, causes said surface 115 to be pressed firmly against the surface 114 to inhibit accidental rotary movement of the shaft 111.

Keyed to the shaft 111 within the cup 109 is a pinion 116; and one or more spring washers 117 are positioned between said pinion and a cotterpin or the like 118 secured to the inner end of the shaft 111, said spring washers comprising the means resiliently urging the surface 115 into contact with the surface 114.

The member 108 is formed with a pair of tapped holes 119 and 120, and with a second pair of tapped holes 121 and 122 each of said pairs of holes lying in a line which perpendicularly intersects the line joining the other pair of holes in the axis of the shaft 111, for a purpose later to be described.

A guide element 123 is formed to provide a guideway 124 in which is reciprocably mounted a rack 125. The guide element 123 is symmetrical at opposite sides of its median point. At one end, a flange 126 is formed to provide a pair of apertures 127 through which may take a pair of screws 128 cooperable with clamping mechanism 129 for gripping an end of the Bowden wire sheath 102. At its opposite end, said guide element is formed with a corresponding flange 130 formed with a pair of apertures 131 adapted alternatively to receive the screws 128 for cooperation with the clamping means 129. The wire 73 of the Bowden wire assembly may pass through either open end of the guide element 123 to be connected to the corresponding end of the rack 125. As illustrated, the sheath is clamped to the flange 126, and the wire is received in a suitable socket 132 in the adjacent end of the rack 125. The wire may be secured to the rack in any one of the well known fashions; and the rack 125 may be identically formed at its opposite ends, or it may be provided with wire-attaching means at one end only, and be reversed within the guideway 124 when it is desired to associate the Bowden wire unit with the flange 130 of the guide element.

Two parallel ears 133 and 134 project from the guide element in the direction of projection of the teeth of the rack 125, and said ears are respectively formed with perforations 135 and 136, elongated in the direction of projection of said ears. Screws 137 and 138 are projectible through said perforations 135 and 136 and into the tapped holes 119 and 120, respectively, for securing the guide element 123 in place.

Now, it will be clear that, because of the elongation of the perforations 135 and 136, the guide element 123 may be selectively positioned in any one of a plurality of locations variously radially spaced from the axis of the shaft 111, whereby the rack teeth may be accurately meshed with the teeth of the pinion 116 or with the teeth of alternatively usable pinions of different pitch diameters.

It will also be clear that, because of the peculiar construction of the mechanism thus far described, the guide element 123 may be alternatively mounted above the axis of the shaft 111, and with its flange 130 presented toward the left, as viewed in Fig. 11, by bringing the perforation 136 into registry with the hole 119 and the perforation 135 into registry with the hole 120. Still further, the guide element 123 may be mounted to the left of the shaft 111 with its flange 130 presented upwardly by bringing the perforation 135 into registry with the hole 122 and the perforation 136 into registry with the hole 121; or it may be mounted to the right of the shaft 111 and with the flange 130 presented upwardly, by bringing the perforation 135 into registry with the hole 121 and the perforation 136 into registry with the hole 122.

The extreme flexibility of mounting of the control station mechanism, whereby the necessity for sharp and multiple bends in the Bowden wire assembly is minimized no matter what the conditions of installation may be, will be readily apparent. After it has been decided in what position the guide element 123 will be mounted, a suitable slot 164 will be cut in the flange of the element 108, in an appropriate position to accommodate the Bowden wire.

The front surface of the element 108 is provided with a suitable scale, as indicated by the reference numeral 139, with which cooperates a pointer 140 carried on the hand wheel 112. Likewise, the hand wheel will preferably carry a stop finger 141 for cooperation with an adjustable stop screw 142.

Reverting to Figs. 1 and 2, it will be seen that the shaft 54, upon which is mounted the worm wheel 53, carries also a sprocket 144, while the screw shaft 21 carries also a sprocket 146. A chain 145 (see Fig. 3) provides a driving connection between the sprockets 144 and 146, whereby the screw shaft 21 is rotationally adjusted whenever the motor 34 is energized. Preferably a guard 143 is provided to cover the chain transmission.

Figure 4:
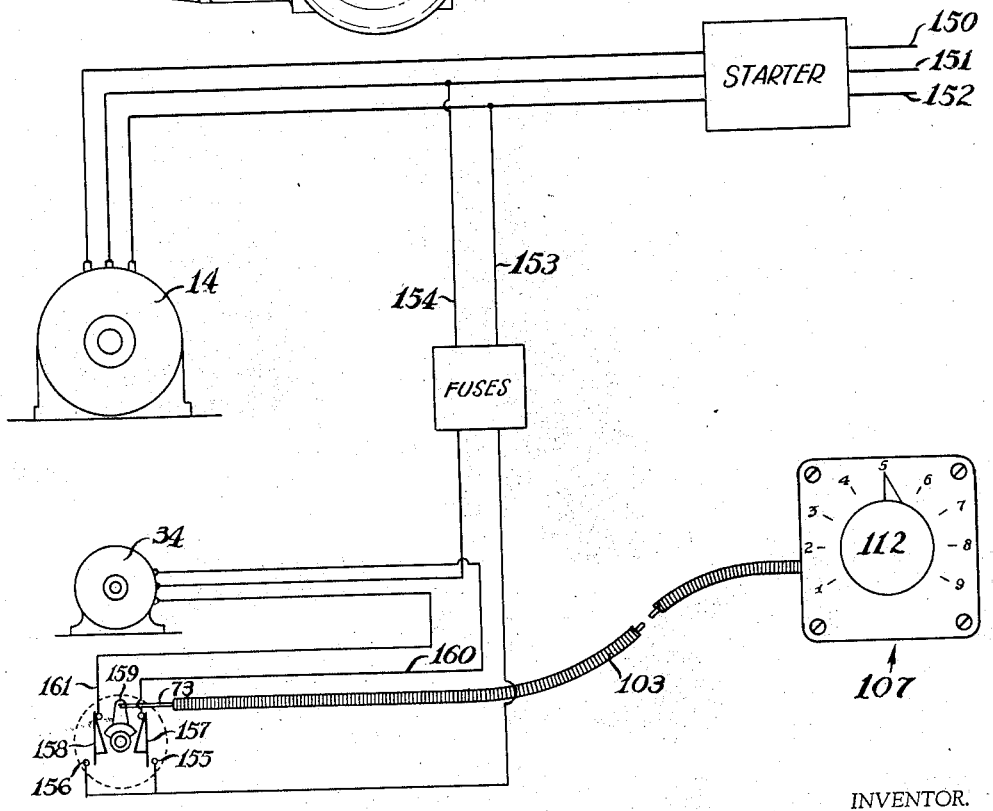
Fig. 4 is a wiring diagram, parts of my control mechanism being illustrated diagrammatically.

In the wiring diagram of Fig 4, I have shown a three phase supply circuit for the motor 14, comprising lead wires 150, 151 and 152 leading to the motor from the source of current and through a standard starter. Wires 153 and 154 lead, respectively, from the wires 152 and 151, and through a fuse box. The wire 153 leads to contact points 155 and 156 with which are associated shiftable contactors 157 and 158, respectively. Said contactors 157 and 158 are permanently connected to leads 160 and 161 which, respectively, extend to the opposite sides of the winding of the reversible electric motor 34, while the lead 154 is the common wire of the forward and reverse energizing circuits for said motor.

In Fig. 4, I have indicated the remote control station mechanism 107, the Bowden wire 103, and cam means, indicated generally by the reference numeral 159, under the control of the Bowden wire and operative alternatively to shift the contactors 157 and 158 into contact with the contact points 155 and 156. The mechanism 107 is so illustrated in Fig. 4 as to indicate that sheath 102 of the Bowden wire assembly is clamped to the flange 130 of the guide element 123, and that the guide element is secured to the member 108 in the position illustrated in Figs. 11, 12 and 13. Therefore, clockwise rotation of the hand wheel 112, as viewed in Fig. 4, will shift the rack 125 toward the left to move the contactor 158 into contact with the point 156, thus establishing a forward energizing circuit for the motor 34 through line wire 152, wire 153, point 156, contactor 158, wire 161, and return wire 154 to line wire 151. Counterclockwise rotation of the hand wheel, on the other hand, will pull on the wire 73 to shift the contactor 157 into contact with the point 155 to establish a circuit from line wire 152 through wire 153, point 155, contactor 157, wire 160, and return wire 154 to line wire 151.

Referring, now, to Figs. 7, 8 and 9, and assuming that the control station illustrated in Fig. 4 is connected to the parts shown in Figs. 7, 8 and 9, clockwise rotation of the hand wheel 112 will push on the wire 73 to shift the carriage 61 in a counter-clockwise direction as viewed in Fig. 9. The shaft 57 and sun gear 59 being stationary, the planet gear 66 will be dragged in a counter-clockwise direction. Through the journal finger 65 and pin 64 the carrier 63 will be caused to partake of the movement of the planet gear 66, whereby the cam 92 will be moved in a counter-clockwise direction to bring its table portion 93 beneath the pin 90, thereby elevating the pin 90 and oscillating the lever 83 in a clockwise direction as viewed in Fig. 5 to depress the button 79 of the switch 78. Thus the first above-traced circuit will be closed to energize the motor 34 to rotate in a counter-clockwise direction as viewed in Fig. 2. Such rotation of the motor 34 will cause counter-clockwise rotation of the shaft 54, as viewed from the right of Fig. 2, which will cause clockwise rotation of the shaft 57 as viewed in Fig. 9. to produce clockwise movement of the planet gear 66, whereby the carrier 63 will be rotated in a clockwise direction as viewed from the top of Fig. 7. Such movement of the carrier 63 will return the cam 92 toward its illustrated position, thereby permitting the pin 90 to drop, and permitting the spring 87 to swing the lever 83 in a counter-clockwise direction as seen in Fig. 5 to release the button 79. As the button 79 reaches its circuit-open position, the motor 34 will be deenergized, as will the solenoid 42, and the spring 50 will shift the follower 49 to cause the discs 46 to grip the discs 45 immediately to arrest rotation of the shaft 37 and its associated parts.

It may be mentioned here that, of course, the leads 162 and 163 of the energizing circuit for the solenoid coil 42 are suitably connected in the energizing circuits for the motor 34 so that said coil 42 is energized whenever either of the motor energizing circuits is closed, and is deenergized whenever both motor energizing circuits are open.

The above-described rotation of the shaft 54 carries with it, of course, the sprocket 144 whereby, through the chain 145 and sprocket 146, the transmission-adjusting shaft 21 is driven in a counter-clockwise direction, the threading of such shaft being such that counter-clockwise rotation thereof shifts the disc 18 toward the disc 16 to increase the output speed of the shaft 12.

Correspondingly, counter-clockwise movement of the hand wheel 112 will pull on the wire 73 to shift the carriage 61, the planet gear 66, and the carrier 63 and its cam 92 in a clockwise direction, whereby the inclined portion 94 of the cam is moved out from beneath the pin 90 and said pin is permitted to drop upon its stop pin 91, under the influence of the spring 87. Thereby, the lever arm 84 is shifted to depress the button 81 of the switch 80 to close the reversing circuit for the motor 34. Operation of the motor in response to such energization will rotate the shaft 54 in a clockwise direction, as viewed from the right of Fig. 2, to move the shaft 57 in a counterclockwise direction, whereby the planet gear and the carrier are shifted in a counter-clockwise direction to return the cam 92 to its illustrated position; and whereby the adjusting shaft 21 is rotated in a clockwise direction to shift the disc 18 away from the disc 16 to reduce the output speed of the shaft 12.

If installation conditions require that the control station be at the left hand side, instead of the right hand side of the mechanism illustrated in Figs. 7, 8 and 9, the Bowden wire sheath may be connected to the flange 126 in the manner illustrated in Figs. 11, 12 and 13. Now, clockwise rotation of the hand wheel 112 will pull on the wire 73. But if the adapter 98 is now associated with the port 104, so that the wire 73 enters the opening 71 from the top, instead of from the bottom, as seen in Fig. 9, a pull exerted on the wire from the control station will still rotate the carriage 61 in a counterclockwise direction to produce an increase in the output speed of the transmission.

However, if it is desired to have the Bowden wire enter the right hand side of the control station, as viewed in Fig. 4, and still enter the port 97 of the housing 58, then the position of the guide element 123 will be reversed. The perforation 136 will be brought into registry with the hole 119, the perforation 135 will be brought into registry with the hole 120, and the Bowden wire sheath will be clamped to the flange 130. Now, rotation of the hand wheel 112 in a clockwise direction will shift the rack 125 to the right, as viewed in Fig. 4, thereby pushing the wire 73 to shift the carriage 61 in a counter-clockwise direction to increase the output speed of the transmission.

The extreme flexibility and possibilities of variations provided by the structure of the present application will thus be apparent.

I claim as my invention:

1. In combination, a housing, a shaft journalled in said housing and carrying a pinion therein, a carriage journalled on said shaft within said housing, a ring gear carried by said carriage, means operatively connected to said carriage for shifting the same, a carrier journalled on said shaft within said housing, a planet gear meshing with said pinion and with said ring gear, means providing an operative connection between said planet gear and said carrier, a cam mounted on said carrier, two switches, an element positioned between said switches and movable oppositely to actuate said switches alternatively, said cam being movable in opposite directions to produce movement of said element in opposite directions.

2. In combination, a housing, a shaft journalled in said housing and carrying a pinion therein, a carriage journalled on said shaft within said housing, a ring gear carried by said carriage, means operatively connected to said carriage for shifting the same, a carrier journalled on said shaft within said housing, a planet gear meshing with said pinion and with said ring gear, a pin oscillably mounted in said carrier upon an axis parallel with said shaft and having an eccentric projection located within the region between said sun gear and said ring gear, said planet gear being journalled on said projection, a cam mounted on said carrier, two switches, an element positioned between said switches and movable oppositely to actuate said switches alternatively, said cam being movable in opposite directions to produce movement of said element in opposite directions.

3. In combination, a housing, a shaft journalled in said housing and carrying a pinion therein, a carriage journalled on said shaft within said housing, a ring gear carried by said carriage, a carrier journalled on said shaft within said housing, a planet gear meshing with said pinion and with said ring gear, means providing an operative connection between said planet gear and said carrier, two switches, an element positioned between said switches and movable oppositely to actuate said switches alternatively, a cam mounted on said carrier and elongated upon an arc of a circle concentric with said shaft, said cam having allochiral end portions adapted to be positioned alternatively for operative association with said element, attaching means carried by said carriage adjacent the periphery thereof, said housing being formed with two ports located respectively on opposite sides of a radius of said carriage extending through said attaching means, and a cable adapted to be projected alternatively through said ports and to be connected to said attaching means for shifting said carriage.

4. In combination, a housing, a shaft journalled in said housing, a carriage in said housing, a carrier in said housing, said carriage and said carrier being oscillable about a common axis, two switches, an element positioned between said switches and movable oppositely to actuate said switches alternatively, a cam mounted on said carrier and elongated upon an arc of a circle concentric with said axis, said cam having allochiral end portions adapted to be positioned alternatively for operative association with said element, a post carried by said carriage, oscillable about an axis parallel with said first-mentioned axis, and provided with a transverse opening therein, said housing being formed with two ports located respectively on opposite sides of a radius of said carriage extending through said post axis, a cable adapted to be projected alternatively through said ports and to be entered in said post opening, means carried by said post and engageable with said cable, when entered in said opening, to secure said cable to said post, and means providing a differential driving connection between said carriage and said carrier and between said shaft and said carrier.

5. In combination, a housing, a shaft journalled in said housing, a carriage in said housing, a carrier in said housing, said carriage and said carrier being oscillable about a common axis, two switches, an element positioned between said switches and movable oppositely to actuate said switches alternatively, a cam mounted on said carrier and elongated upon an arc of a circle concentric with said axis, said cam having allochiral end portions adapted to be positioned alternatively for operative association with said element, attaching means carried by said carriage adjacent the periphery thereof, said housing being formed with two ports located respectively on opposite sides of a radius of said carriage extending through said attaching means, a cable adapted to be projected alternatively through said ports and to be connected to said attaching means for shifting said carriage, and means providing a differential driving connection between said carriage and said carrier and between said shaft and said carrier.

6. In combination, a housing, a shaft journalled in said housing, a carriage in said housing, a carrier in said housing, said carriage and said carrier being oscillable about a common axis, two switches, an element positioned between said switches and movable oppositely to actuate said switches alternatively, a cam mounted on said carrier and elongated upon an arc of a circle concentric with said axis, said cam having allochiral end portions adapted to be positioned alternatively for operative association with said element, attaching means carried by said carriage adjacent the periphery thereof, said housing being formed with two ports located respectively on opposite sides of a radius of said carriage extending through said attaching means, a Bowden wire, an adapter secured to one end of the sheath of said Bowden wire, means for alternatively securing said adapter to said housing in registry with said ports, the wire of said Bowden wire being projectible through the selected port for connection to said attaching means, a member formed to provide a cup, a rock shaft journalled in said member, a pinion carried by said rock shaft within said cup, a guide, means for securing said guide in place in said cup in any one of a plurality of positions with respect to said rock shaft, means for securing the other end of said sheath to said guide, a rack reciprocable in said guide and meshing with said pinion, means for securing the other end of said wire to said rack, and means providing a differential driving connection between said carriage and said carrier and between said shaft and said carrier.

7. In combination, a housing, a shaft journalled in said housing, a carriage in said housing, a carrier in said housing, said carriage and said carrier being oscillable about a common axis, two switches, an element positioned between said switches and movable oppositely to actuate said switches alternatively, a cam mounted on said carrier and elongated upon an arc of a circle concentric with said axis, said cam having allochiral end portions adapted to be positioned alternatively for operative association with said element, attaching means carried by said carriage adjacent the periphery thereof, said housing being formed with two ports located respectively on opposite sides of a radius of said carriage extending through said attaching means, a Bowden wire, an adapter secured to one end of the sheath of said Bowden wire, means for alternatively securing said adapter to said housing in registry with said ports, the wire of said Bowden wire being projectible through the selected port for connection to said attaching means, a member formed to provide a cup, a rock shaft journalled in said member, a pinion carried by said rock shaft within said cup, a guide having identical opposite ends, means for securing said guide in place in said cup in any one of a plurality of positions with respect to said rock shaft, means for securing the other end of said sheath alternatively to the ends of said guide, a rack reciprocable in said guide and meshing with said pinion, means for securing the other end of said wire alternatively to the ends of said rack, and means providing a differential driving connection between said carriage and said carrier and between said shaft and said carrier.

8. In combination, a shaft, means providing a journal mounting for said shaft, a pinion fixed on said shaft, a carriage journalled on said shaft, a ring gear carried by said carriage, means operatively connected to said carriage for shifting the same, a carrier journalled on said shaft, a planet gear meshing with said pinion and with said ring gear, means providing an operative connection between said planet gear and said carrier, a cam mounted on said carrier, two switches, an element positioned between said switches and movable oppositely to actuate said switches alternatively, said cam being movable in opposite directions to produce movement of said element in opposite directions.

9. In combination, a shaft, means providing a journal mounting for said shaft, a pinion fixed on said shaft, a carriage journalled on said shaft, a ring gear carried by said carriage, means operatively connected to said carriage for shifting the same, a carrier journalled on said shaft, a journal element mounted on said carrier upon an axis parallel with said shaft but offset therefrom, said journal element having an eccentric projection, a planet gear supported for rotation about the axis of said projection and meshing with said pinion and with said ring gear, a cam mounted on said carrier, two switches, an element positioned between said switches and movable oppositely to actuate said switches alternatively, said cam being movable in opposite directions to produce movement of said element in opposite directions.

10. In combination, a shaft, means providing a journal mounting for said shaft, a pinion fixed on said shaft, a carriage journalled on said shaft, a ring gear carried by said carriage, means operatively connected to said carriage for shifting the same, a carrier journalled on said shaft, a journal element mounted on said carrier for oscillable adjustment about an axis parallel with said shaft but offset therefrom, means for securing said journal element in any desired position of adjustment, said journal element having an eccentric projection, a planet gear supported for rotation about the axis of said projection and meshing with said pinion and with said ring gear, a cam mounted on said carrier, two switches, an element positioned between said switches and movable oppositely to actuate said switches alternatively, said cam being movable in opposite directions to produce movement of said element in opposite directions.

11. In combination, a shaft, means providing a journal mounting for said shaft, a pinion fixed on said shaft, a carriage journalled on said shaft, a ring gear removably carried by said carriage, means operatively connected to said carriage for shifting the same, a carrier journalled on said shaft, a journal element mounted on said carrier for oscillable adjustment about an axis parallel with said shaft but offset therefrom, means for securing said journal element in any desired position of adjustment, said journal element having an eccentric projection, a planet gear supported for rotation about the axis of said projection and meshing with said pinion and with said ring gear, a cam mounted on said carrier, two switches, an element positioned between said switches and movable oppositely to actuate said switches alternatively, said cam being movable in opposite directions to produce movement of said element in opposite directions.

12. In combination, a shaft, means providing a journal mounting for said shaft, a pinion fixed on said shaft, a carriage journalled on said shaft, a ring gear carried by said carriage, an element swivelly mounted near the periphery of said carriage upon an axis parallel with said shaft, said element being formed with a transaxial bore, a carrier journalled on said shaft, a planet gear meshing with said pinion and with said ring gear, means providing an operative connection between said planet gear and said carrier, a cam mounted on said carrier, two switches, an element positioned between said switches and movable oppositely to actuate said switches alternatively, said cam being movable in opposite directions to produce movement of said element in opposite directions.

WALTER H. TROEMEL.

REFERENCES CITED

The following references are of record in the file of this patent:

UNITED STATES PATENTS

| Number | Name | Date |
| --- | --- | --- |
| 2,214,807 | Buckley | Sept. 17, 1940 |
| 1,830,369 | McIntosh | Nov. 3, 1931 |
| 1,732,945 | Novick | Oct. 22, 1929 |
| 2,355,587 | Reeves | Aug. 8, 1944 |
| 1,954,142 | Moffett | Apr. 10, 1934 |
| 2,090,812 | Schmitt | Aug. 24, 1937 |
| 2,141,056 | Watkins | Dec. 20, 1938 |

FOREIGN PATENTS

| Number | Country | Date |
| --- | --- | --- |
| 556,287 | Great Britain | Sept. 28, 1943 |